United States Patent
Dekarske

(10) Patent No.: US 8,925,955 B2
(45) Date of Patent: Jan. 6, 2015

(54) HITCH APPARATUS FOR VEHICLES

(71) Applicant: TeleSwivel, LLC, Durham, NC (US)

(72) Inventor: David Allen Dekarske, Waterford, MI (US)

(73) Assignee: TeleSwivel, LLC, Durham, NC (US)

( * ) Notice: Subject to any disclaimer, the term of this patent is extended or adjusted under 35 U.S.C. 154(b) by 0 days.

(21) Appl. No.: 14/051,162

(22) Filed: Oct. 10, 2013

(65) Prior Publication Data

US 2014/0117646 A1    May 1, 2014

Related U.S. Application Data

(60) Provisional application No. 61/718,463, filed on Oct. 25, 2012.

(51) Int. Cl.
  *B60D 1/44* (2006.01)
  *B60D 1/06* (2006.01)

(52) U.S. Cl.
  CPC . *B60D 1/44* (2013.01); *B60D 1/065* (2013.01)
  USPC .......................... 280/512; 280/491.3; 280/511

(58) Field of Classification Search
  USPC ............. 280/477, 479.3, 478.1, 479.1, 479.2, 280/480, 480.1, 491.2, 494
  See application file for complete search history.

(56) References Cited

U.S. PATENT DOCUMENTS

| | | | |
|---|---|---|---|
| 2,745,680 A * | 5/1956 | Jones et al. | 280/499 |
| 3,717,362 A * | 2/1973 | Johnson | 280/416.1 |
| 6,902,181 B1 | 6/2005 | Dye | |
| 6,974,148 B2 * | 12/2005 | Moss et al. | 280/511 |
| 7,556,279 B2 * | 7/2009 | Suhling | 280/512 |
| 7,909,350 B1 * | 3/2011 | Landry | 280/511 |
| 8,201,844 B1 | 6/2012 | Smoot | |
| 2004/0084877 A1 | 5/2004 | Smith | |
| 2009/0322059 A1 | 12/2009 | Williams, Jr. | |
| 2012/0217724 A1 | 8/2012 | Works | |

OTHER PUBLICATIONS

Notification of Transmittal of the International Search Report and the Written Opinion of the International Searching Authority, or the Declaration corresponding to International Patent Application No. PCT/US2013/064482; Date of Mailing: Jan. 23, 2014; International Search Report; Written Opinion of the International Searching Authority; 11 pages.

* cited by examiner

*Primary Examiner* — Joseph Rocca
*Assistant Examiner* — Jacob Knutson
(74) *Attorney, Agent, or Firm* — Myers Bigel Sibley & Sajovec

(57) ABSTRACT

A hitch apparatus includes a an elongated hitch member having a distal free end and an opposite proximal end. The hitch member is configured to be movably secured within a hitch receiver of a vehicle, and movable between retracted and extended positions relative to the hitch receiver. A first locking mechanism is operably secured to the hitch receiver and releasably engages the hitch member to maintain the hitch member in a retracted position. A housing is attached to the hitch member distal end. The housing includes an opening formed through a portion thereof, and a shaft is movably secured within the housing and is axially rotatable within the housing. A second locking mechanism is operably secured to the housing that releasably engages the shaft to prevent rotation of the shaft. An elongated coupler arm extends through the housing opening and is secured to the shaft such that the coupler arm rotates with the shaft.

21 Claims, 10 Drawing Sheets

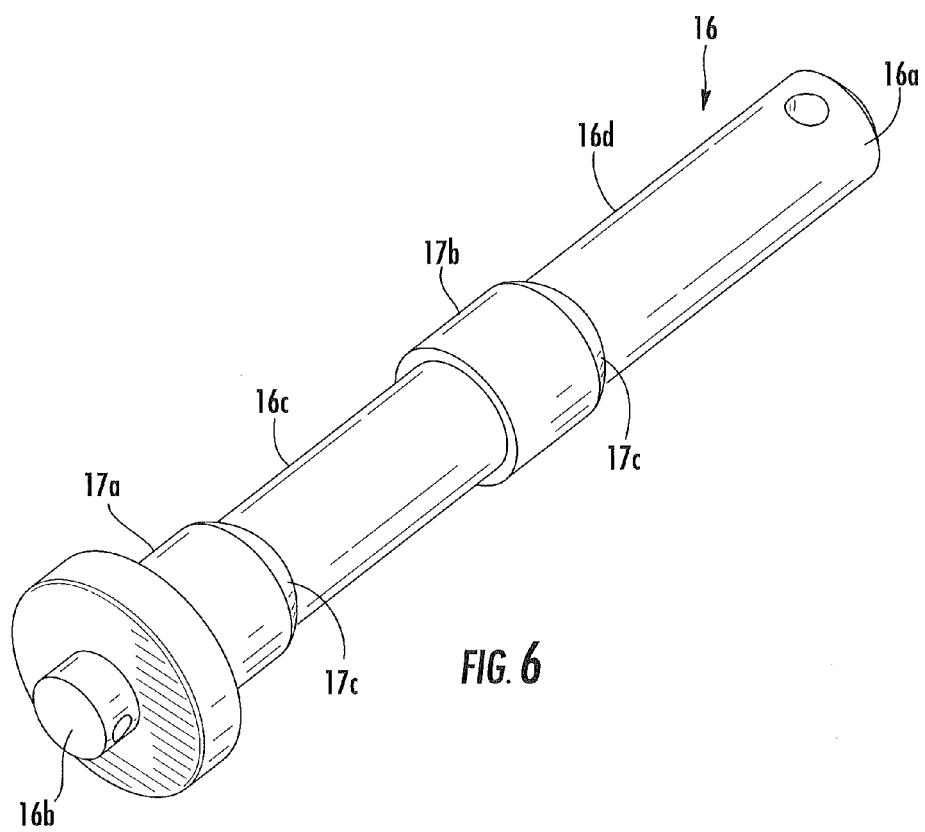

HITCH APPARATUS FOR VEHICLES

RELATED APPLICATION

This application claims the benefit of and priority to U.S. Provisional Patent Application No. 61/718,463 filed Oct. 25, 2012, the disclosure of which is incorporated herein by reference as if set forth in its entirety.

FIELD OF THE INVENTION

The present invention relates generally to vehicle towing and, more particularly, to towing apparatus.

BACKGROUND

Powered and trailed vehicles are conventionally interconnected for travel by coupling hitches involving fixed locations on the vehicles. Using ball and socket-type universal connections or pin-type connections, the required relative movement during travel is provided. The fixed locations, however, may be difficult to effect, particularly with large vehicles that prevent ready manual alignment for final coupling. When accurate alignment is not obtained, conventionally the towed vehicle is manually moved to proper position, which may require strength, dexterity and multiple personnel, often with an attendant risk of injury. As the tongue weight of a towed vehicle increases, the skill required and risk associated with coupling the towed vehicle to a towing vehicle may be substantially increased.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a hitch apparatus includes an elongated hitch member having a distal free end and an opposite proximal end. The hitch member is configured to be movably secured within a hitch receiver of a vehicle, and movable between retracted and extended positions relative to the hitch receiver. A locking mechanism is operably secured to the hitch receiver and releasably engages the hitch member to maintain the hitch member in a fully retracted position. A housing is attached to the hitch member proximal end. The housing includes an opening formed through a portion thereof, and a shaft is movably secured within the housing so as to be axially rotatable within the housing. Another locking mechanism is operably secured to the housing that releasably engages the shaft to prevent unwanted rotation of the shaft when the hitch apparatus is in towing position. In some embodiments of the present invention, an axis of the shaft extends along a direction that is substantially orthogonal to a direction defined by the elongated hitch member.

The hitch apparatus also includes an elongated coupler arm having opposite proximal and distal ends. The coupler arm proximal end extends through the housing opening and is secured to the shaft. When the shaft is free to rotate, the coupler arm moves with the shaft (i.e., pivots relative to the axis of the shaft).

In some embodiments of the present invention, the housing opening has a configuration that limits an amount the coupler arm distal free end can pivot as a result of shaft rotation. For example, in some embodiments, the housing opening has a configuration that allows the coupler arm distal end to pivot within an arc of about one hundred eighty degrees (180°).

In some embodiments of the present invention, the housing opening comprises a notch. The coupler arm comprises an alignment member that is configured to engage the notch when the coupler arm is aligned for towing. The housing opening has a lower portion on both sides of the notch and each lower portion is sloped downwardly towards the notch such that the coupler arm alignment member is assisted by gravity to engage the notch. When aligned for towing, the coupler arm defines a direction that is substantially parallel to a direction defined by the elongated hitch member.

In some embodiments of the present invention, the distal free end of the coupler arm is configured to removably receive a coupling apparatus, such as a ball coupler, a pintle hook, a cushioned pintle hook, a swivel pintle hook, a lunette ring, a clevis pin attachment, etc. In other embodiments of the present invention, a coupling apparatus such as a ball coupler, a pintle hook, a cushioned pintle hook, a swivel pintle hook, a lunette ring, a clevis pin attachment, etc., may be permanently secured to the distal free end of the coupler arm.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

FIG. 6 is a perspective view of the first locking mechanism locking pin of the hitch apparatus of FIG. 1, according to some embodiments of the present invention.

DETAILED DESCRIPTION

Figure 1:
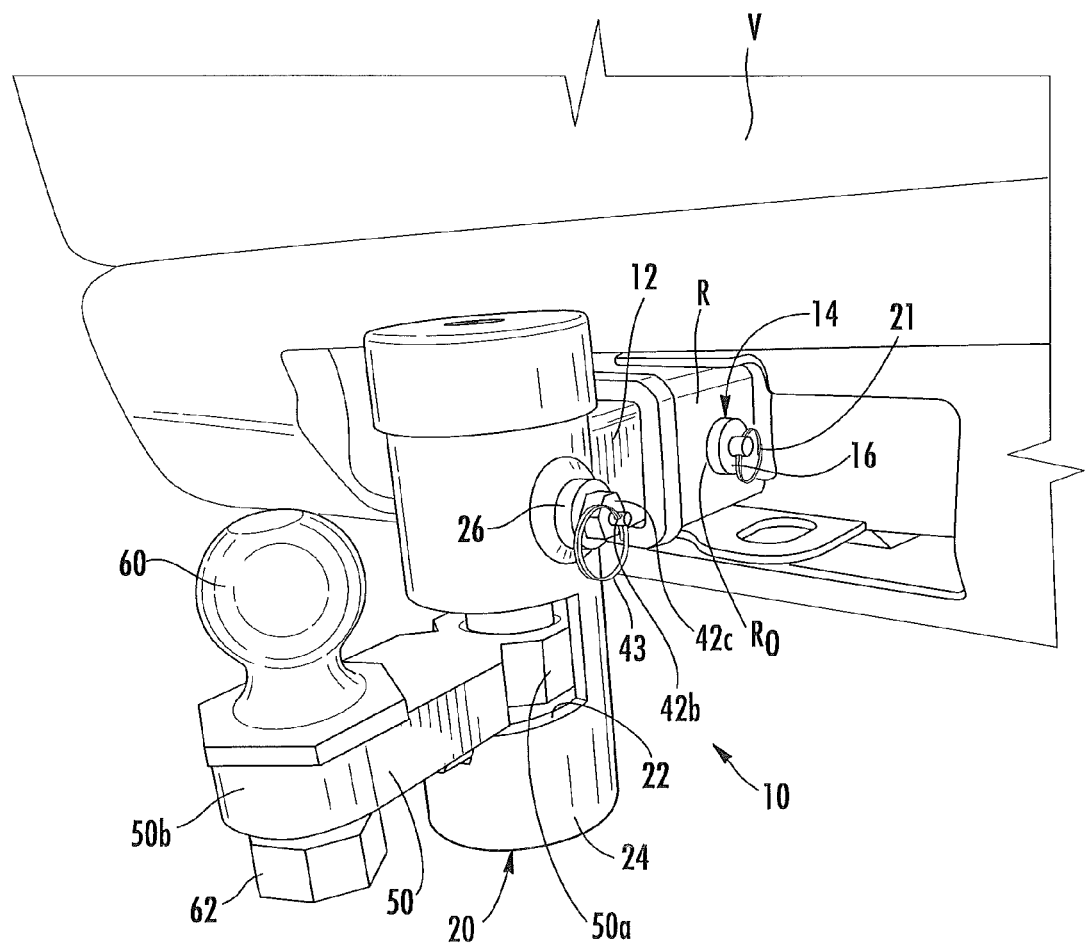
FIG. 1 is a first perspective view of a hitch apparatus mounted to a vehicle, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure, although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

Figure 2:
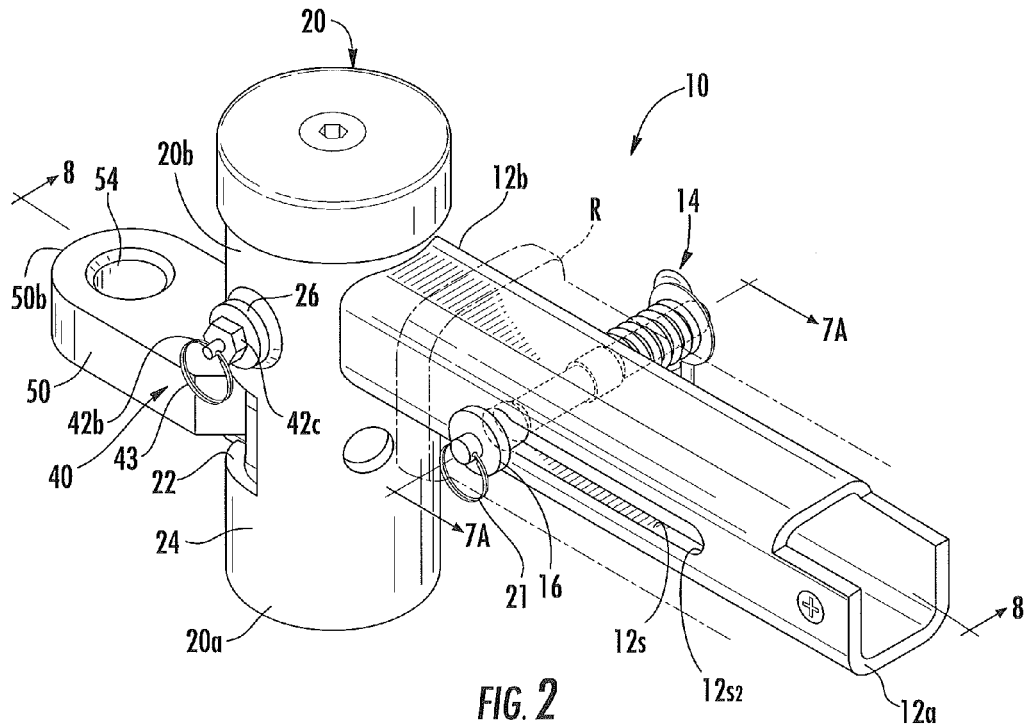
FIG. 2 is a second perspective view of the hitch apparatus of FIG. 1 with the hitch member fully retracted within a receiver hitch (shown in phantom line), according to some embodiments of the present invention.
Figure 2A:
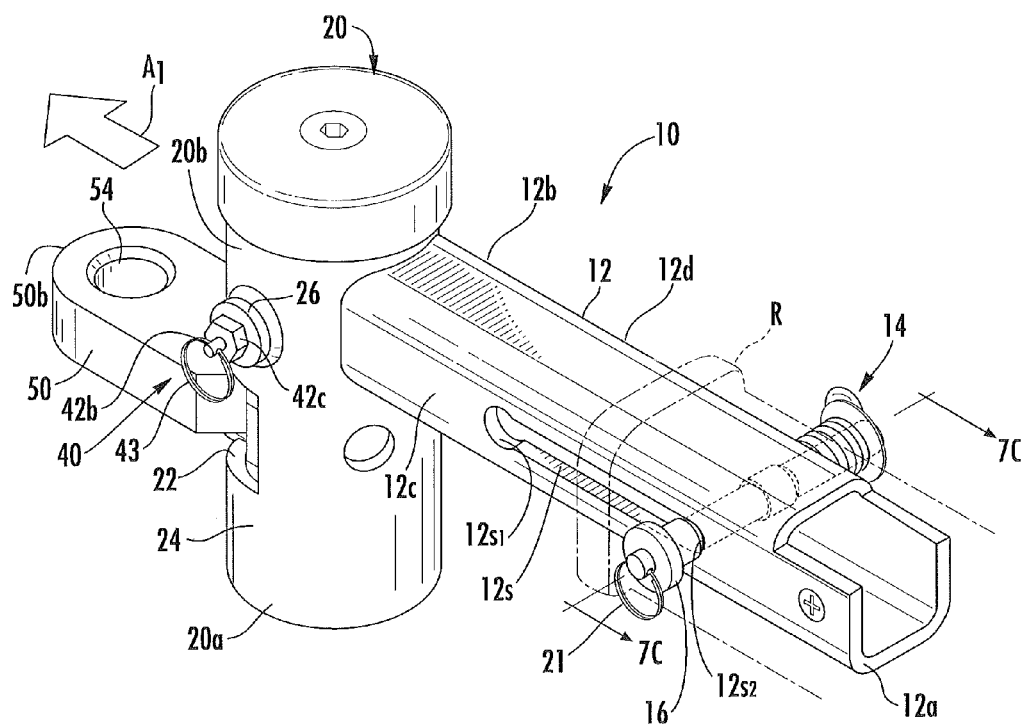
FIG. 2A is a perspective view of the hitch apparatus of FIG. 2 with the hitch member extended relative to the receiver hitch, according to some embodiments of the present invention.

Referring now to the figures, a hitch apparatus 10 (FIG. 1), according to some embodiments of the present invention, is illustrated. The hitch apparatus 10 includes an elongated hitch member 12 having a distal free end 12a (FIG. 2) and an opposite proximal end 12b (FIG. 2). The hitch member distal free end 12a is configured to be inserted within a hitch receiver R of a vehicle V (FIG. 1). The hitch receiver R is attached to the vehicle V, as would be understood by those skilled in the art. The hitch member 12 is movably secured within the hitch receiver R such that the hitch apparatus 10 is movable between retracted positions (FIG. 2) and extended positions (FIG. 2A) along the direction indicated by arrow $A_1$ (FIG. 2A). The illustrated hitch member 12 is a structural member fashioned of tubular or square pipe that is configured to matingly engage the hitch receiver R, which is also a structural member fashioned of tubular or square pipe. However, other shapes and configurations of the hitch receiver R and hitch member 12 may be utilized as long as the hitch member 12 can matingly engage the hitch receiver R and can be moved between extended and retracted positions.

Figure 3:
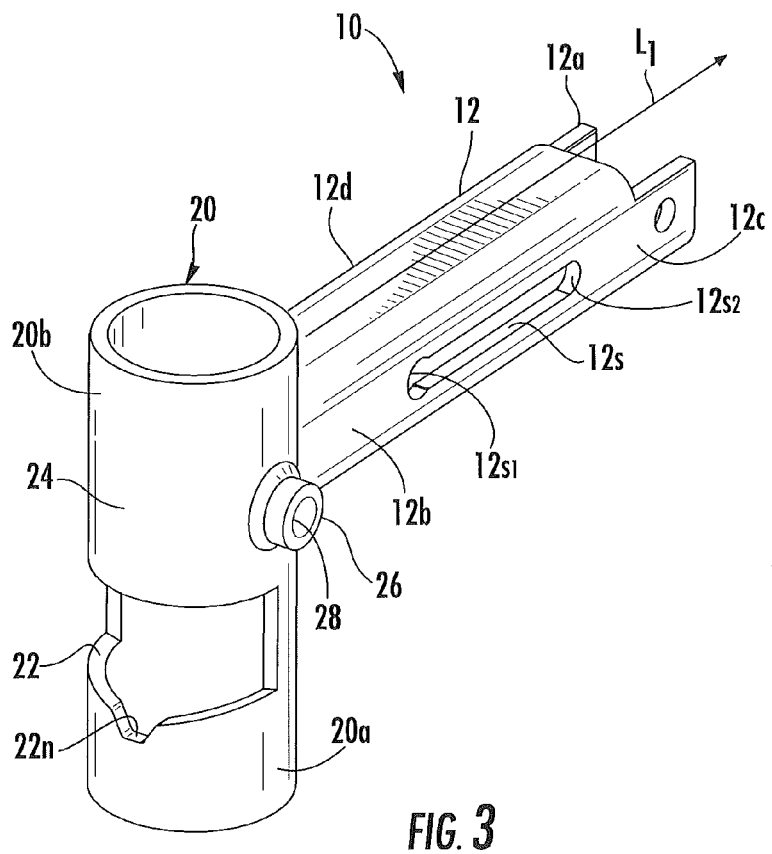
FIG. 3 is a perspective view of the housing and hitch member of the hitch apparatus of FIG. 1, and with the coupler arm and shaft removed.
Figure 4:
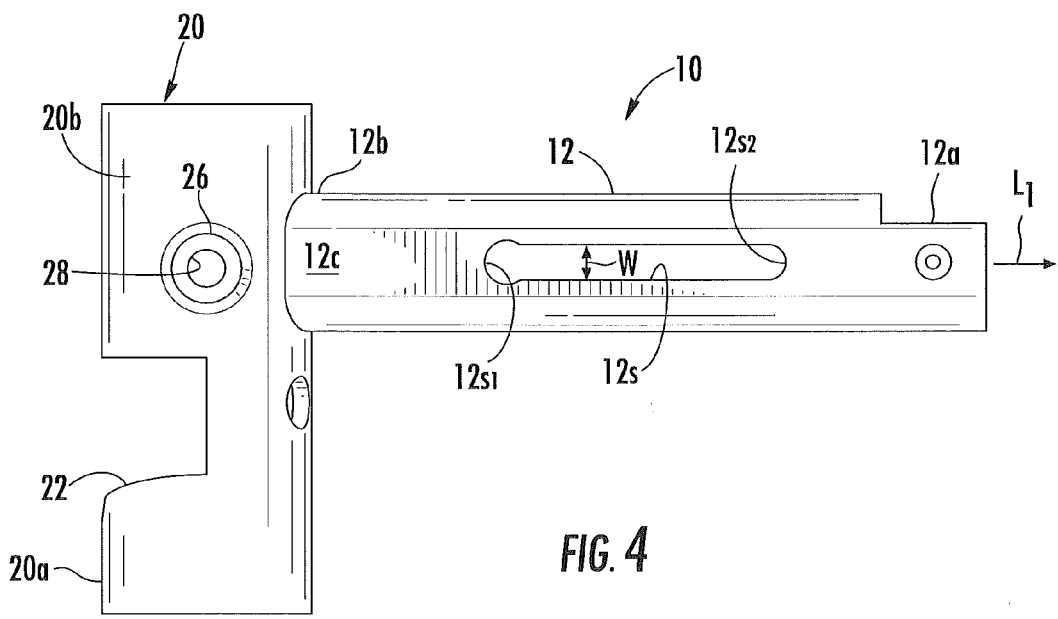
FIG. 4 is a side elevation view of the housing and hitch member of FIG. 3.

Referring to FIGS. 3 and 4, the illustrated hitch member 12 includes opposite walls 12c, 12d. In each wall 12c, 12d, a respective elongated slot $12_S$ is formed. Each slot $12_S$ includes opposite end portions $12_{S1}$, $12_{S2}$. End portion $12_{S1}$ is enlarged relative to the remaining portion of the slot $12_S$, as illustrated. The hitch member slots $12_S$ in walls 12c, 12d are configured to receive and cooperate with a locking pin 16 (FIG. 2) of a first locking member 14 (FIG. 2), as described below.

Figure 7A:
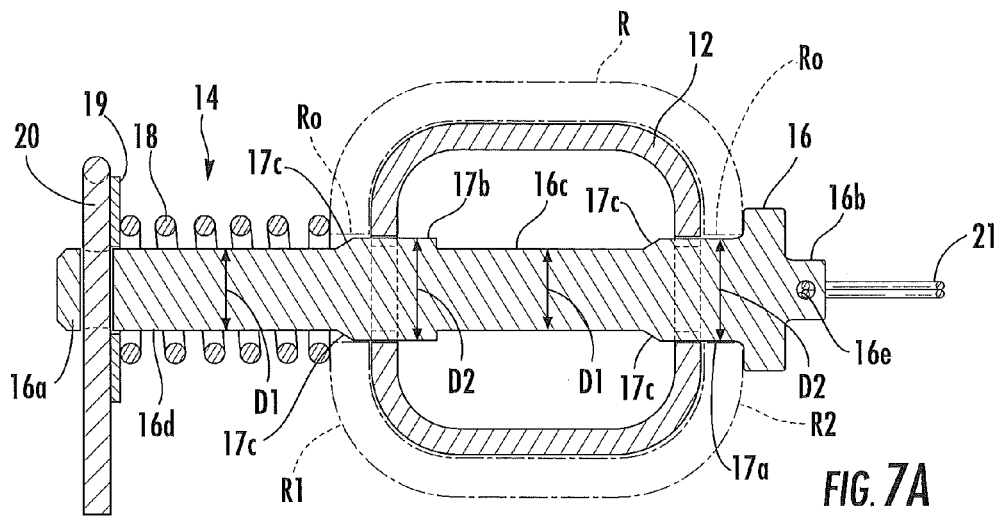
FIG. 7A is a cross-sectional view of the hitch apparatus of FIG. 2 taken along lines 7A-7A and illustrating the hitch member in a fully retracted position within the hitch receiver and with the first locking mechanism locking pin preventing the hitch member from being extended outwardly from the receiver hitch.
Figure 7B:
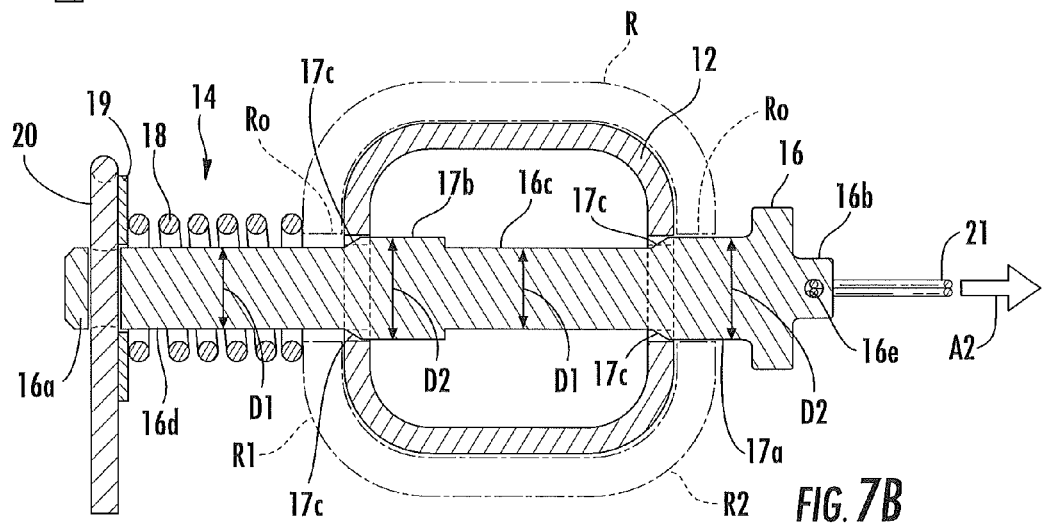
FIG. 7B illustrates the locking pin of FIG. 7A being moved in the direction of arrow $A_2$ such that the hitch member can be extended from the receiver hitch.
Figure 7C:
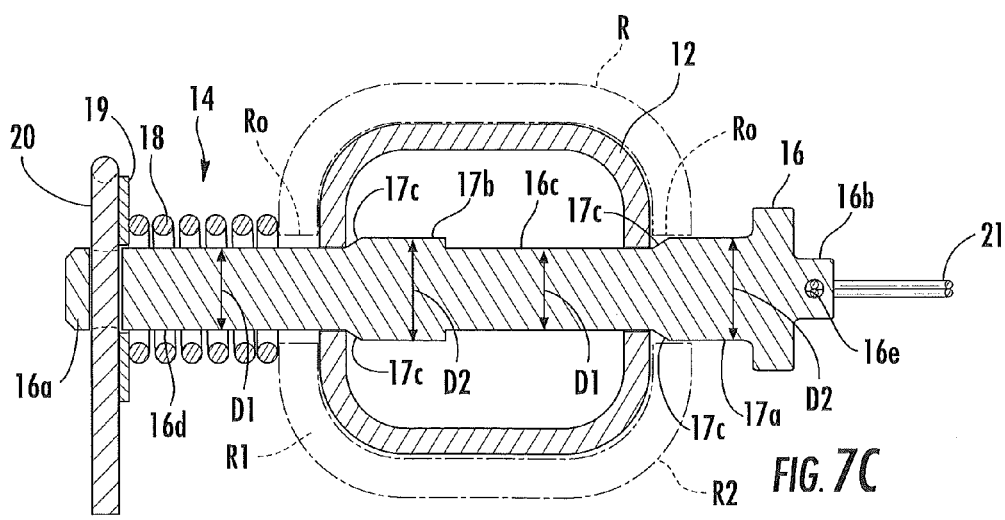
FIG. 7C is a cross-sectional view of the hitch apparatus of FIG. 2 taken along lines 7C-7C and illustrating the locking pin of FIG. 7B fully moved in the direction of arrow $A_2$ and with the hitch member fully extended outwardly from the receiver hitch.

The first locking mechanism 14 is operably secured to the hitch receiver R via respective apertures Ro formed through respective opposite walls $R_1$, $R_2$ of the hitch receiver R, as illustrated in FIGS. 7A-7C. The first locking mechanism 14 releasably engages the hitch member 12 to maintain the hitch member 12 in a fully retracted position within the hitch receiver R, as illustrated in FIG. 2. The first locking mechanism 14 includes an elongated locking pin 16 having opposite distal and proximal end portions 16a, 16b. The locking pin 16 includes portions 16c, 16d that have the same diameter $D_1$. The locking pin 16 also includes portions 17a, 17b that have the same diameter $D_2$. Diameter $D_2$ is greater than the diameter $D_1$.

In the illustrated embodiment, the first locking mechanism 14 includes a spring 18 that surrounds locking pin portion 16d and that is positioned between hitch receiver wall R1 and a washer 19 that is secured to the distal end 16a of the locking pin 16. The washer 19 is secured to the distal end 16a of the locking pin 16 via a cotter pin 19 or other similar locking mechanism, as would be known to those skilled in the art. The illustrated first locking mechanism 14 also includes a ring 21 secured to the locking pin proximal end portion 16b via aperture 16e formed through the locking pin proximal end portion 16b, as illustrated. The ring 21 is configured to be grasped by a user so as to pull the locking pin 16 in the direction of arrow $A_2$ and against the biasing force of the spring 18.

Embodiments of the present invention are not limited to the illustrated configuration of locking pin 16 or to requiring a user to pull the locking pin 16 to allow the hitch member 12 to be extended. For example, in some embodiments, the pin 16 can have a different length and configuration such that the spring 18 is located on the opposite end thereof and such that a user pushes the pin 16 to allow the hitch member 12 to be extended.

Still referring to FIGS. 7A-7C, the locking pin 16 is configured to cooperate with the hitch member slots $12_S$ in walls 12c, 12d to permit the hitch member 12 to move between extended and retracted positions. In FIG. 7A, the hitch member 12 is in a fully retracted position (as also illustrated in FIGS. 1 and 2) and the locking pin portions 17a, 17b are engaged with the enlarged end portions $12_{S1}$ of the respective slots $12_S$ in walls 12c, 12d of the hitch member 12. When the locking pin portions 17a, 17b are engaged with the enlarged end portions $12_{S1}$ of the respective slots $12_S$, the hitch member 12 is prevented from extending outwardly from the hitch receiver R. This is because the locking pin portions 17a, 17b are larger in diameter ($D_2$) than the width W of each of the slots $12_S$, thereby blocking movement of the hitch member 12 (i.e., preventing the hitch member 12 from being extended outwardly relative to the receiver R).

FIG. 7B illustrates the locking pin 16 being pulled in the direction of arrow $A_2$ such that the hitch member 12 can be extended from the hitch receiver R. In FIG. 7C, the locking pin 16 is fully moved in the direction of arrow $A_2$ such that the pin portions 17A, 17b are no longer engaged with the enlarged end portions $12_{S1}$ of the respective slots $12_S$ in walls 12c, 12d of the hitch member 12. The portions 16c, 16d of the locking pin, which have a diameter $D_1$ that is less than the width W of each respective slot $12_S$ are now in communication with each respective slot $12_S$ and the hitch member 12 can be extended outwardly relative to the receiver hitch R, as illustrated in FIG. 2A.

The biasing force of the spring 18 urges the locking pin to engage the enlarged end portions $12_{S1}$ of the respective slots $12_S$ in walls 12c, 12d of the hitch member 12 when the hitch member 12 is moved to the fully retracted position (FIGS. 1, 2). The locking pin 16 also includes a tapered portion 17c adjacent to each portion 17a, 17b, as illustrated. The tapered portion 17c facilitates a smooth transition of the locking pin portions 17a, 17b into engagement with the enlarged end portions $12_{S1}$ of the respective slots $12_S$ in walls 12c, 12d.

Referring back to FIGS. 3 and 4, the illustrated hitch apparatus 10 includes a housing 20 that is attached to the hitch member proximal end 12b. The illustrated housing 20 is generally cylindrically-shaped with opposite end portions 20a, 20b. Although illustrated as having a generally cylindrical shape, the housing 20 can have various shapes and configurations. Embodiments of the present invention are not limited to a generally cylindrically-shaped housing 20.

The housing 20 includes an opening 22 formed through a portion of the housing wall 24, as illustrated. The housing opening 22 has a configuration that limits an amount that the coupler arm 50 (described below) can pivot. The housing opening 22 includes a notch 22n formed in the lower central portion of the housing wall 24, as illustrated. As will be described below, an alignment member 58 of the coupler arm 50 is configured to engage with the notch 22n when the coupler arm 50 is aligned for towing, and is configured to maintain the coupler arm 50 in towing alignment.

The lower portion of the housing opening 22 is sloped downwardly towards the notch 22n on both sides of the notch 22n, as illustrated in FIGS. 3 and 4. This sloped configuration allows gravity to help align and center the coupler arm 50 for towing. In other words, the opening is shaped such that the coupler arm alignment member 58 is encouraged to become engaged with the notch 22n.

Figure 8:
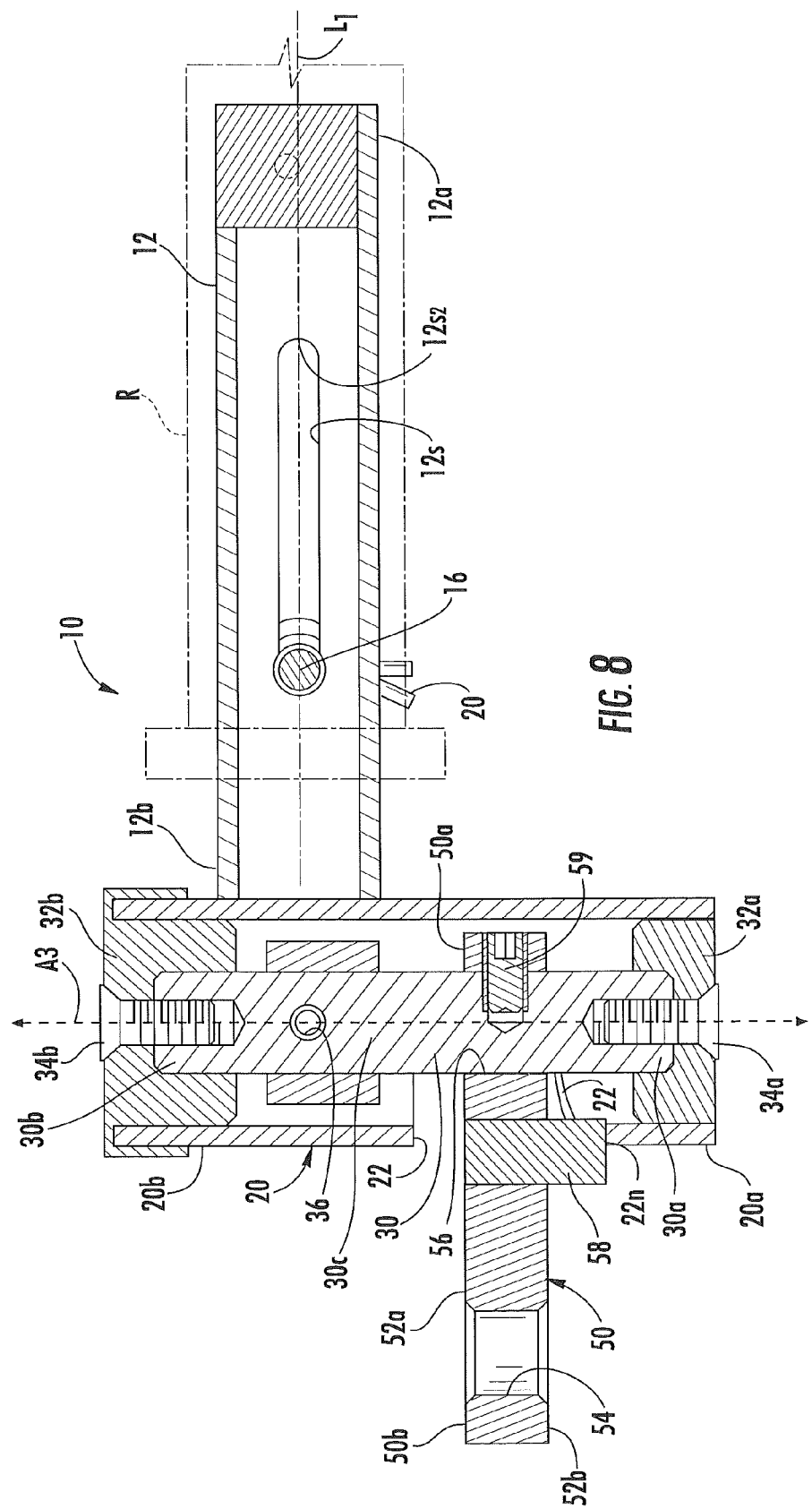
FIG. 8 is a cross-sectional view of the hitch apparatus of FIG. 2 taken along lines 8-8.

Referring to FIG. 8, an elongated shaft 30 is movably secured within the housing 20 and is rotatable within the housing about its axis $A_3$ (i.e., the shaft is axially rotatable). The axis $A_3$ of the shaft 30 is substantially orthogonal to the longitudinal direction $L_1$ defined by the elongated hitch member 12. The shaft 30 has opposite end portions 30a, 30b that are each secured to a respective support member 32a, 32b via a respective fastener 34a, 34b, such as a threaded bolt, that threadingly engages a respective threaded bore in the shaft end portions 30a, 30b. Thus, the support members 32a, 32b, with the shaft 30 secured thereto, rotate as a unit within the housing 20. However, embodiments of the present invention are not limited to the illustrated configuration of the shaft 30. The shaft 30 may be movably secured within the housing 20 in various ways to facilitate axial rotation thereof, without limitation.

Each of the support members 32a, 32b may be formed from a bearing material, or may be coated with a bearing material, to facilitate rotation thereof within the housing 20. An exemplary bearing material that may be utilized in accordance with embodiments of the present invention is NYLATRON® brand bearing material. NYLATRON® brand bearing material has numerous properties that are particularly suitable for the hitch apparatus 10. For example, NYLATRON® brand bearing material has high mechanical strength, stiffness, hardness, and toughness. In addition, NYLATRON® brand bearing material exhibits good fatigue resistance, high mechanical damping ability, good sliding properties, and good wear resistance. However, various other types of bearing materials may be utilized with embodiments of the present invention, without limitation.

The shaft 30 also includes a bore 36 formed in an intermediate portion 30c thereof that is configured to receive the locking pin 42 (FIGS. 9A-9C) of the second locking mechanism 40. The second locking mechanism 40 is operably secured to the housing 20 and is configured to releasably engage the shaft 30 to prevent rotation of the shaft 30. As illustrated in FIGS. 2 and 2A, the second locking mechanism 40 includes an elongated pin 42 having opposite distal and proximal end portions 42a (FIG. 9A), 42b. The second locking mechanism pin 42 is configured to be operably mounted to the housing 20 via a raised boss 26 having a bore 28 formed therethrough (FIGS. 3 and 4). The second locking mechanism 40 also includes a spring or other biasing member (not shown) that surrounds a portion of the locking pin 42 within the housing 20 and that is configured to urge the pin 42 into engagement with the shaft bore 36 when the shaft 30 is in a towing position. The proximal end portion 42b of the pin 42 includes a flange 42c that is configured to abut the raised boss 26 under the biasing force of the spring and when the pin distal end portion 42a is inserted within the shaft bore 36.

The illustrated second locking mechanism 40 also includes a ring 43 secured to the locking pin proximal end portion 42b. The ring 43 is configured to be grasped by a user so as to pull the locking pin 42 in the direction of arrow $A_3$ (FIG. 9A) and against the biasing force of the spring. However, in other embodiments, a knob or other structure may be utilized that facilitates gripping by a user and operation of the locking pin 42 (e.g., via pushing the locking pin 42 or pulling the locking pin 42). When the locking pin 42 is disengaged from the shaft bore 36, the shaft 30 and supporting members 32a, 32b are free to rotate within the housing 20.

Figure 5:
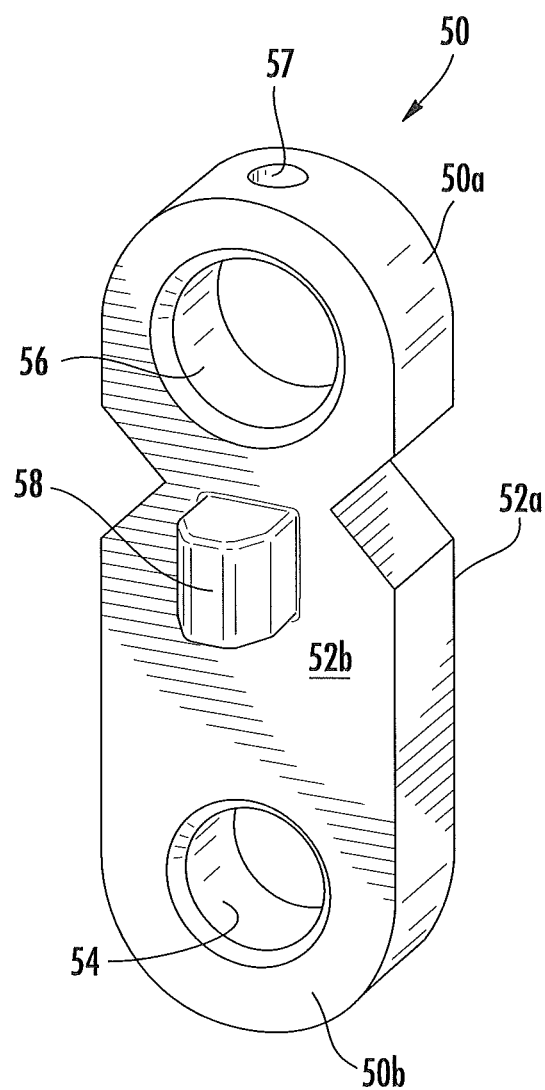
FIG. 5 is a perspective view of the coupler arm of the hitch apparatus of FIG. 1.

Referring to FIG. 5, the hitch apparatus 10 includes an elongated coupler arm 50 having opposite proximal and distal ends 50a, 50b and opposite faces 52a, 52b. The coupler arm 50 includes a first bore 54 formed therethrough adjacent the distal end 50b and a second bore 56 formed therethrough adjacent the proximal end 50a. An alignment member 58 extends outwardly from coupler arm face 52b, as illustrated. The alignment member 58 is configured to engage the notch 22n in the housing opening 22 when the coupler arm 50 is aligned for towing. When aligned for towing, the coupler arm 50 defines a direction (i.e., extends in a direction) that is substantially parallel to direction $L_1$ defined by the elongated hitch member 12.

The coupler arm proximal end 50a extends through the housing opening 22 and is secured to the shaft 30 such that the coupler arm 50 rotates with the shaft. Specifically, the shaft 30 extends through the second bore 56 and the coupler arm 50 is secured to the shaft 30 via a fastener 59, such as a threaded bolt, that extends through a third bore 57 in the coupler arm distal end 50a and that threadingly engages a threaded bore in an intermediate portion of the shaft, as illustrated in FIG. 8.

The coupler arm 50 may be attached to the shaft 30 in various ways, without limitation. For example, in some embodiments of the present invention, the coupler arm may be welded to the shaft 30. Embodiments of the present invention are not limited to the illustrated manner in which the coupler arm 50 and shaft 30 are secured together.

The housing opening 22 has a configuration that limits an amount the coupler arm distal end 50b can pivot. For example, in some embodiments, the housing opening 22 has a configuration that allows the coupler arm distal end 50b to pivot within an arc of about one hundred eighty degrees (180°). However, other configurations of the opening 22 can be provided that allow for different degrees of pivoting (e.g., more than 180° and less than 180°, etc.).

The distal end 50b of the coupler arm 50 is configured to removably receive a coupling apparatus 60 (FIG. 1). Exemplary coupling apparatus 60 that may be secured to the proximal end 50b of the coupler arm 50 include, but are not limited to, ball couplers, pintle hooks, cushioned pintle hooks, swivel pintle hooks, lunette rings, clevis pin attachments, etc. In the illustrated embodiment of FIG. 1, the coupling apparatus 60 is removably secured to the coupler arm 50 via a threaded portion that extends through bore 56 and a nut 62 threadingly engaging the threaded portion, as would be understood by those skilled in the art. In other embodiments of the present invention, a coupling apparatus such as a ball coupler, a pintle hook, a cushioned pintle hook, a swivel pintle hook, a lunette ring, a clevis pin attachment, etc., may be permanently secured the proximal end 50b of the coupler arm 50.

Figure 9A:
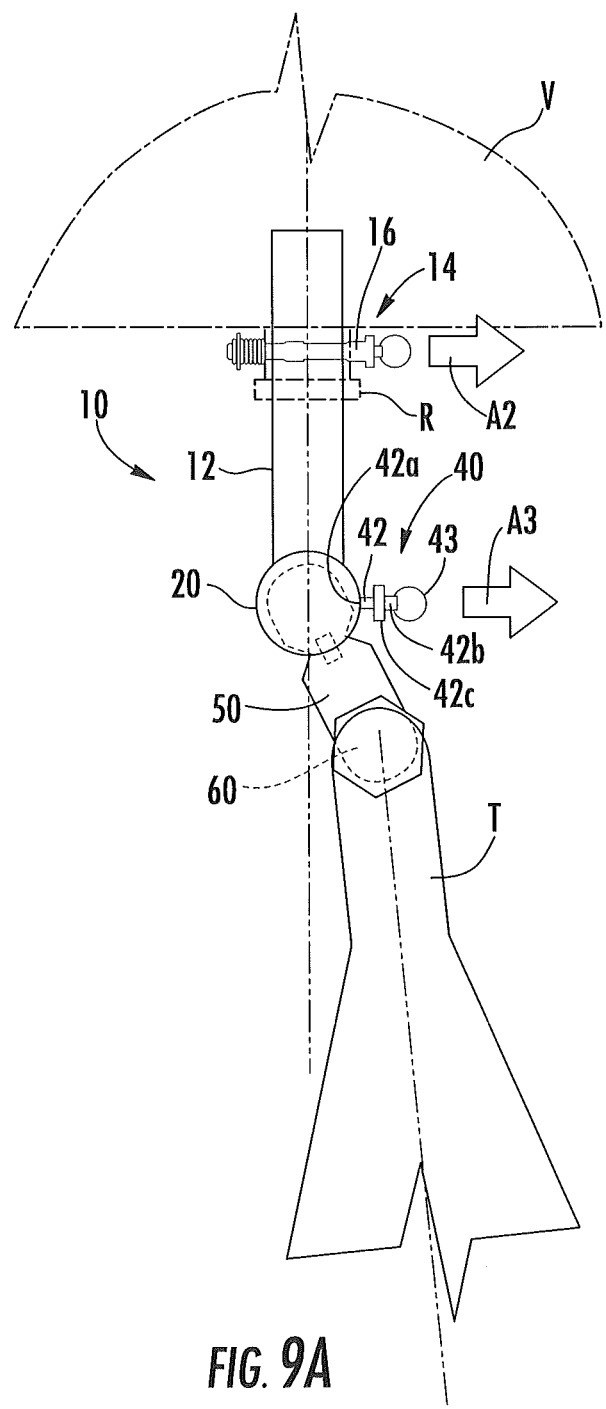
FIGS. 9A-9C are schematic views illustrating operation of the hitch apparatus of FIG. 1 when connected to a towed vehicle.
Figure 9B:
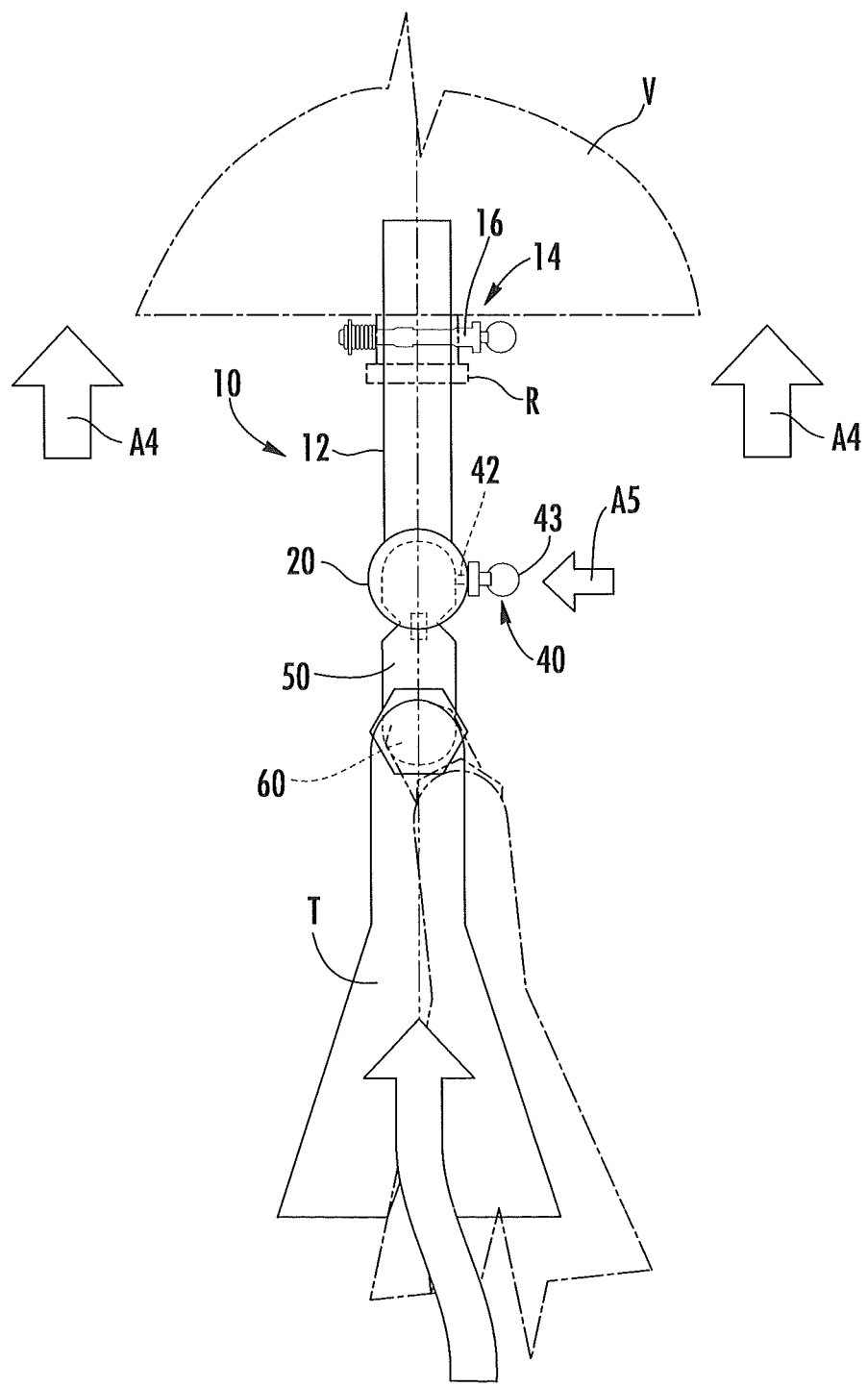
Figure 9C:
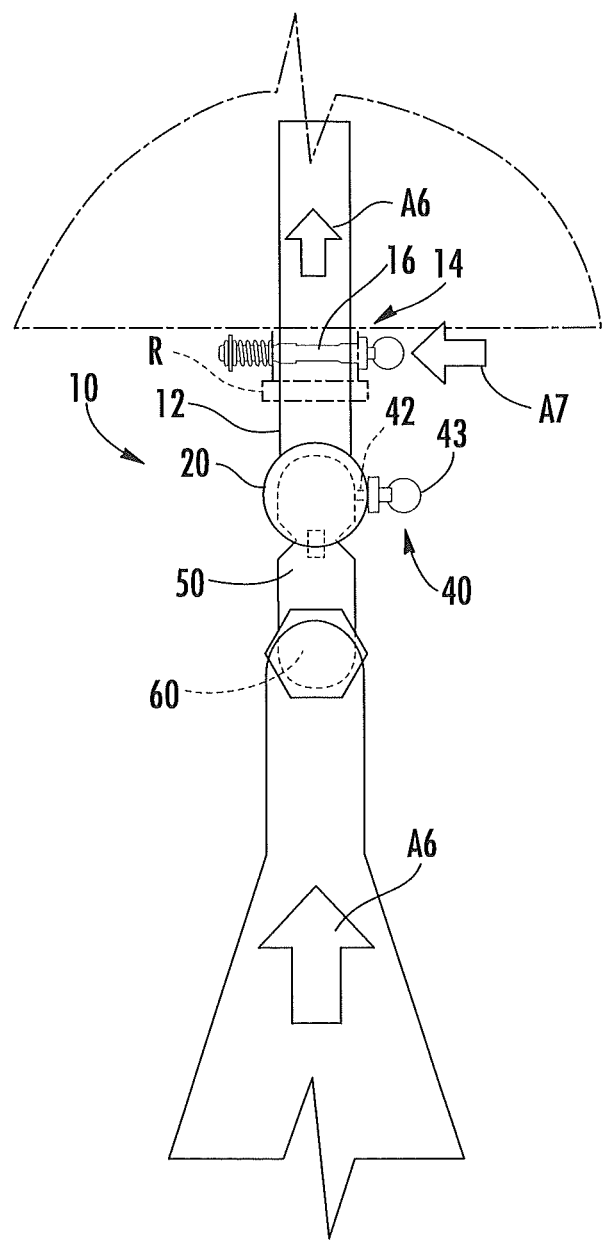

Referring now to FIGS. 9A-9C, operation of the hitch apparatus 10 will be described. In FIG. 9A, the locking pin 16 of the first locking mechanism 14 has been moved sufficiently by a user in the direction of arrow A2 to allow the hitch member 12 to be extended outwardly relative to the receiver hitch R. In addition, the locking pin 42 of the second locking mechanism 40 has been moved in the direction of arrow A3 to allow the coupler arm 50 to be rotated relative to the housing 20. A trailer tongue T is attached to the ball coupler 60 at the coupler arm distal end 50b.

In FIG. 9B, the vehicle V is moved in the direction indicated by arrows A4, which causes the coupler arm 50 to rotate such that the alignment member 58 engages with the notch 22n of the housing opening 22, and such that the locking pin 42 of the second locking mechanism 40 engages with the bore 36 in the shaft 30 within housing 20. The coupler arm 50 and the trailer tongue T are now in alignment with the hitch member 12 (i.e., the longitudinal direction defined by the elongated coupler arm 50 is substantially parallel with the longitudinal direction $L_1$ defined by the elongated hitch member 12.

In FIG. 9C, the vehicle is stopped from moving, for example by a driver of the vehicle applying the brakes of the vehicle, which causes the hitch member 12 to move in the direction indicated by arrow A6 and thereby fully retract into the receiver hitch R, and which causes the spring-biased locking pin 16 of the first locking mechanism to become engaged with the enlarged end portions $12_{S1}$ of the respective slots $12_S$ in walls 12c, 12d of the hitch member 12, and thereby lock the hitch member 12 in the fully retracted position. The spring 18 is configured to urge the locking pin 16 back into a locking position as illustrated in FIG. 7A. The hitch apparatus 10 is now in a towing position.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A hitch apparatus, comprising:
    an elongated hitch member having a distal free end and an opposite proximal end, wherein the hitch member distal end is configured to be inserted within a hitch receiver of a vehicle, and wherein the hitch member is movable within the hitch receiver between retracted and extended positions;
    a locking mechanism operably secured to the hitch receiver that releasably engages the hitch member to maintain the hitch member in the retracted position;
    a housing attached to the hitch member proximal end, wherein the housing comprises an opening with a notch and a lower portion on both sides of the notch;
    a shaft movably secured within the housing so as to be capable of axial rotation; and
    a coupler arm having opposite proximal and distal ends, wherein the coupler arm proximal end extends through the housing opening and is secured to the shaft, wherein the coupler arm comprises an alignment member that is configured to engage the notch when the coupler arm is aligned for towing, and wherein each lower portion of the housing opening is sloped downwardly towards the notch such that the alignment member is assisted by gravity to engage the notch.

2. The hitch apparatus of claim 1, further comprising a locking mechanism operably secured to the housing that releasably engages the shaft to prevent rotation of the shaft.

3. The hitch apparatus of claim 1, wherein the coupler arm distal end comprises a coupling apparatus.

4. The hitch apparatus of claim 3, wherein the coupling apparatus is a ball coupler, a pintle hook, a cushioned pintle hook, a swivel pintle hook, a lunette ring, or a clevis pin attachment.

5. The hitch apparatus of claim 1, wherein the coupler arm distal end is configured to removably receive a ball coupler, a pintle hook, a cushioned pintle hook, a swivel pintle hook, a lunette ring, or a clevis pin attachment.

6. The hitch apparatus of claim 1, wherein an axis of the shaft extends along a first direction that is substantially orthogonal to a second direction defined by the elongated hitch member.

7. The hitch apparatus of claim 1, wherein the housing opening has a configuration that limits an amount the coupler arm distal end can pivot.

8. The hitch apparatus of claim 1, wherein a locking mechanism engages the shaft to prevent rotation of the shaft when the coupler arm alignment member is engaged with the notch.

9. The hitch apparatus of claim 1, wherein the housing opening has a configuration that allows the coupler arm distal end to pivot within an arc of about one hundred eighty degrees (180°).

10. The hitch apparatus of claim 1, wherein the coupler arm defines a third direction, and wherein the third direction is substantially parallel to a second direction defined by the elongated hitch member when the alignment member engages the notch.

11. A hitch apparatus, comprising:
an elongated hitch member having a distal free end and an opposite proximal end, wherein the hitch member distal end is configured to be inserted within a hitch receiver of a vehicle, and wherein the hitch member is movable within the hitch receiver between retracted and extended positions;
a locking mechanism operably secured to the hitch receiver that releasably engages the hitch member to maintain the hitch member in the retracted position;
a housing attached to the hitch member proximal end, wherein the housing comprises an opening with a notch and a lower portion on both sides of the notch;
a shaft movably secured within the housing so as to be capable of axial rotation; and
a coupler arm having opposite proximal and distal ends, wherein the coupler arm proximal end extends through the housing opening and is secured to the shaft, wherein the coupler arm distal end comprises a coupling apparatus, wherein the coupler arm comprises an alignment member that is configured to engage the notch when the coupler arm is aligned for towing, and wherein each lower portion of the housing opening is sloped downwardly towards the notch such that the alignment member is assisted by gravity to engage the notch.

12. The hitch apparatus of claim 11, further comprising a locking mechanism operably secured to the housing that releasably engages the shaft to prevent rotation of the shaft.

13. The hitch apparatus of claim 11, wherein the coupling apparatus is a ball coupler, a pintle hook, a cushioned pintle hook, a swivel pintle hook, a lunette ring, or a clevis pin attachment.

14. The hitch apparatus of claim 11, wherein an axis of the shaft extends along a first direction that is substantially orthogonal to a second direction defined by the elongated hitch member.

15. The hitch apparatus of claim 11, wherein the housing opening has a configuration that limits an amount the coupler arm distal end can pivot.

16. The hitch apparatus of claim 11, wherein a locking mechanism engages the shaft to prevent rotation of the shaft when the alignment member is engaged with the notch.

17. The hitch apparatus of claim 11, wherein the housing opening has a configuration that allows the coupler arm distal end to pivot within an arc of about one hundred eighty degrees (180°).

18. A hitch apparatus, comprising:
an elongated hitch member having a distal free end and an opposite proximal end, wherein the hitch member distal end is configured to be inserted within a hitch receiver of a vehicle;
a housing attached to the hitch member proximal end, wherein the housing comprises an opening with a notch and a lower portion on both sides of the notch; and
a coupler arm pivotably secured to the housing and having a distal end extending outwardly from the housing through the opening, wherein the coupler arm comprises an alignment member that is configured to engage the notch when the coupler arm is aligned for towing, and wherein each lower portion of the housing opening is sloped downwardly towards the notch such that the alignment member is assisted by gravity to engage the notch.

19. The hitch apparatus of claim 18, wherein the coupler arm distal end comprises a coupling apparatus.

20. The hitch apparatus of claim 18, wherein the coupler arm distal end is configured to removably receive a ball coupler, a pintle hook, a cushioned pintle hook, a swivel pintle hook, a lunette ring, or a clevis pin attachment.

21. The hitch apparatus of claim 18, wherein the housing opening has a configuration that limits an amount the coupler arm distal end can pivot.

* * * * *

UNITED STATES PATENT AND TRADEMARK OFFICE
CERTIFICATE OF CORRECTION

PATENT NO.         : 8,925,955 B2  
APPLICATION NO.    : 14/051162  
DATED              : January 6, 2015  
INVENTOR(S)        : Dekarske Page 1 of 1

It is certified that error appears in the above-identified patent and that said Letters Patent is hereby corrected as shown below:

In the Claims:
Column 9, Claim 8, Line 30: Please correct "the coupler arm alignment"
to read -- the alignment --

Signed and Sealed this
Thirtieth Day of June, 2015

Michelle K. Lee
*Director of the United States Patent and Trademark Office*